R. NYE.
RAT TRAP.
APPLICATION FILED NOV. 16, 1911.
1,026,362.
Patented May 14, 1912.
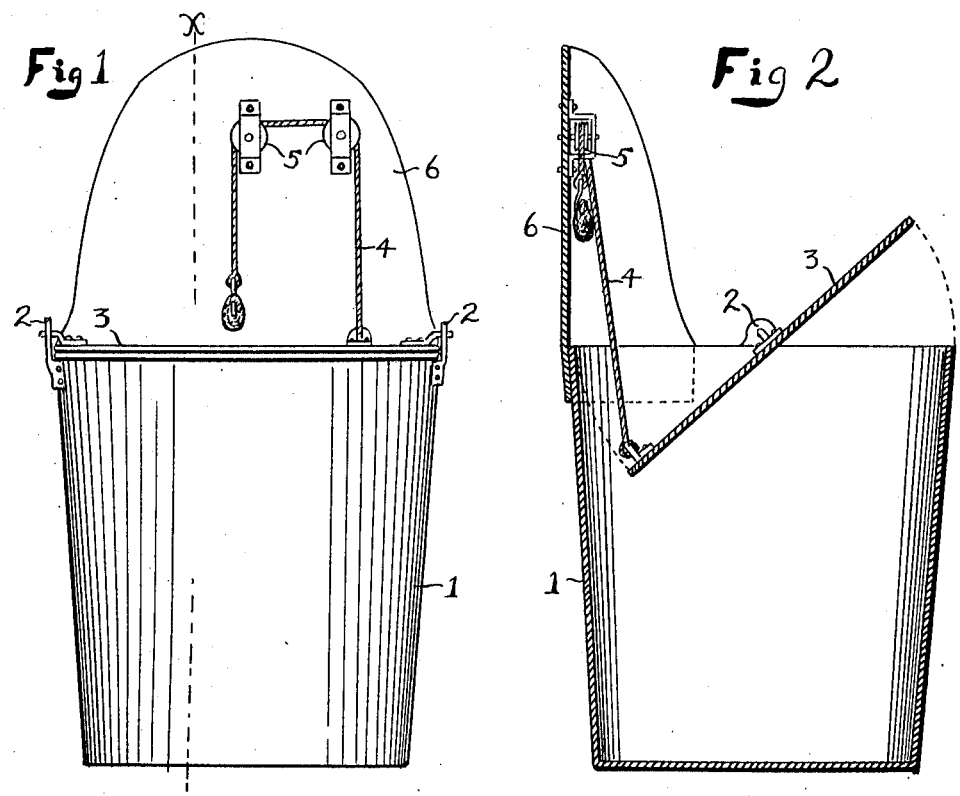
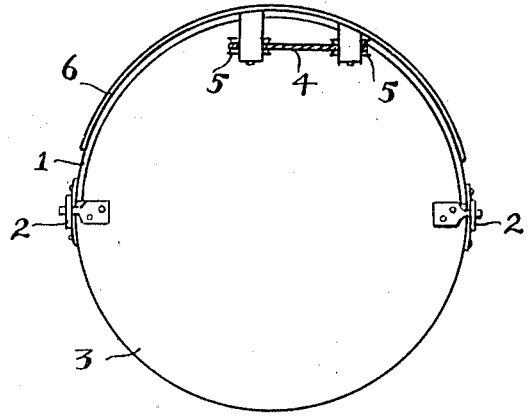
WITNESSES
H. B. Clark,
A. H. Kephart
INVENTOR
Robert Nye
BY
Carlos P. Griffin
ATTORNEY

UNITED STATES PATENT OFFICE.

ROBERT NYE, OF GRASS VALLEY, CALIFORNIA.

RAT-TRAP.

1,026,362.  Specification of Letters Patent.  Patented May 14, 1912.

Application filed November 16, 1911. Serial No. 660,677.

*To all whom it may concern:*

Be it known that I, ROBERT NYE, a citizen of the United States, residing at Grass Valley, in the county of Nevada and State of California, have invented a new and useful Rat-Trap, of which the following is a specification in such full and clear terms as will enable those skilled in the art to construct and use the same.

This invention relates to a rat trap and its object is to make a trap which will be very simple and effective, while at the same time it resets itself each time a rat or other animal is caught therein.

Another object of the invention is to provide means whereby the bait used to toll the animal into the trap will automatically move out of the way of the animal when it is caught by the trap, and will then move back into position for attracting another animal into the trap.

Another object of the invention is to provide means whereby the top of the trap may be suitably weighted to balance the same should it be too heavy on one side for any reason.

In the drawings, in which the same numeral of reference is applied to the same portion throughout the several views, Figure 1 is a front elevation of the trap set ready for use, Fig. 2 is a vertical sectional view of the trap on the line $x-x$ Fig. 1, showing the cover tilted, and Fig. 3 is a plan view of the trap.

The numeral 1 represents the body of the trap which is merely a common form of frusto-conical bucket of such size as may be necessary for the rodents it is desired to catch in the trap. The ordinary three gallon bucket is large enough for rats where there are great numbers of them, while a two or three quart bucket would be large enough to catch mice and such small rodents.

The bucket has ears 2 at each side thereof, said ears pivotally supporting a cover 3. The cover 3 rests on the top of one side of the bucket, while the other side thereof lies entirely within the circumference of the bucket. This cover is so balanced that it will normally lie horizontal, as indicated in Fig. 1, but as soon as the rodent walks over toward the bait the cover tilts up and causes it to slide into the bucket, which is partially filled with water to drown the animal, and to prevent his escape from the bucket.

In order to regulate the force with which the cover will resist overbalancing a cord 4 is secured to the downwardly movable edge of the cover, and the cord passes through two small pulleys 5 near the top of a shield 6, the free end of the cord being used for attaching a suitably heavy piece of bait. It will be noted that the bait on the cord is so positioned as to attract the rodent to the side away from the side of the cover at which the cord is secured thereto to prevent it from catching the cord to keep from falling into the water in the bucket.

The shield 6 is high enough to insure against the animal jumping out over the top of the same, and it also provides a suitable support for the pulleys over which the cord passes.

Having thus described my invention what I claim as new and desire to secure by Letters Patent of the United States is as follows:

1. In a rat trap, a receptacle for liquid, a cover on the top thereof balanced and pivoted thereon, one side of said cover being adapted to turn downwardly into said receptacle, a shield extending upwardly from one side of said receptacle, a bait holding cord attached to said cover and a pulley supported by said shield and over which said cord moves, as described.

2. In a rat trap, a receptacle for liquid, a cover on the top thereof balanced and pivoted thereon, a shield extending upwardly from one side of said receptacle, a bait holding cord attached to said cover, and means carried by the shield for suitably supporting the bait holding cord so that one end thereof will support bait adjacent the downwardly movable edge of said cover, as described.

In testimony whereof I have hereunto set my hand this seventh day of November A. D. 1911, in the presence of the two subscribed witnesses.

ROBERT NYE.

Witnesses:
 DAVID C. WAITE,
 EUGENE HUGHES.